Aug. 18, 1925.
A. R. COSGROVE ET AL
1,550,605
SPRING SUPPORT
Filed Dec. 11, 1924　　3 Sheets-Sheet 3
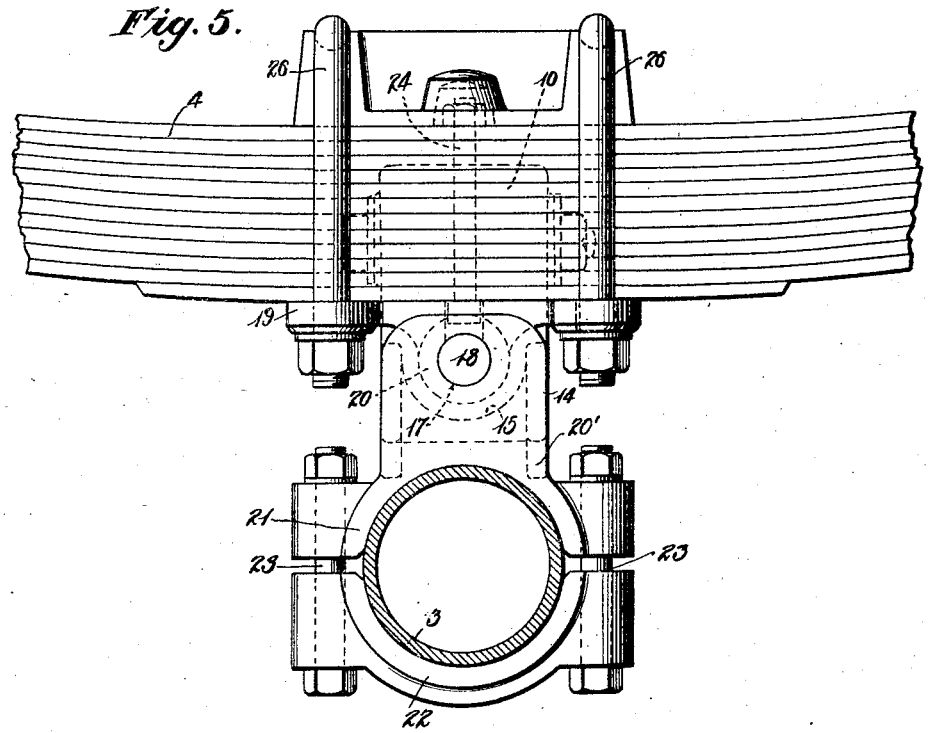
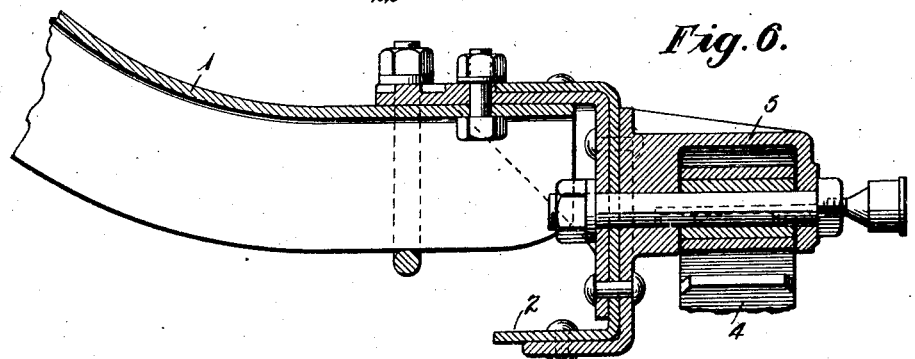
Inventors
A. R. Cosgrove
and E. L. Kraft Patented Aug. 18, 1925.

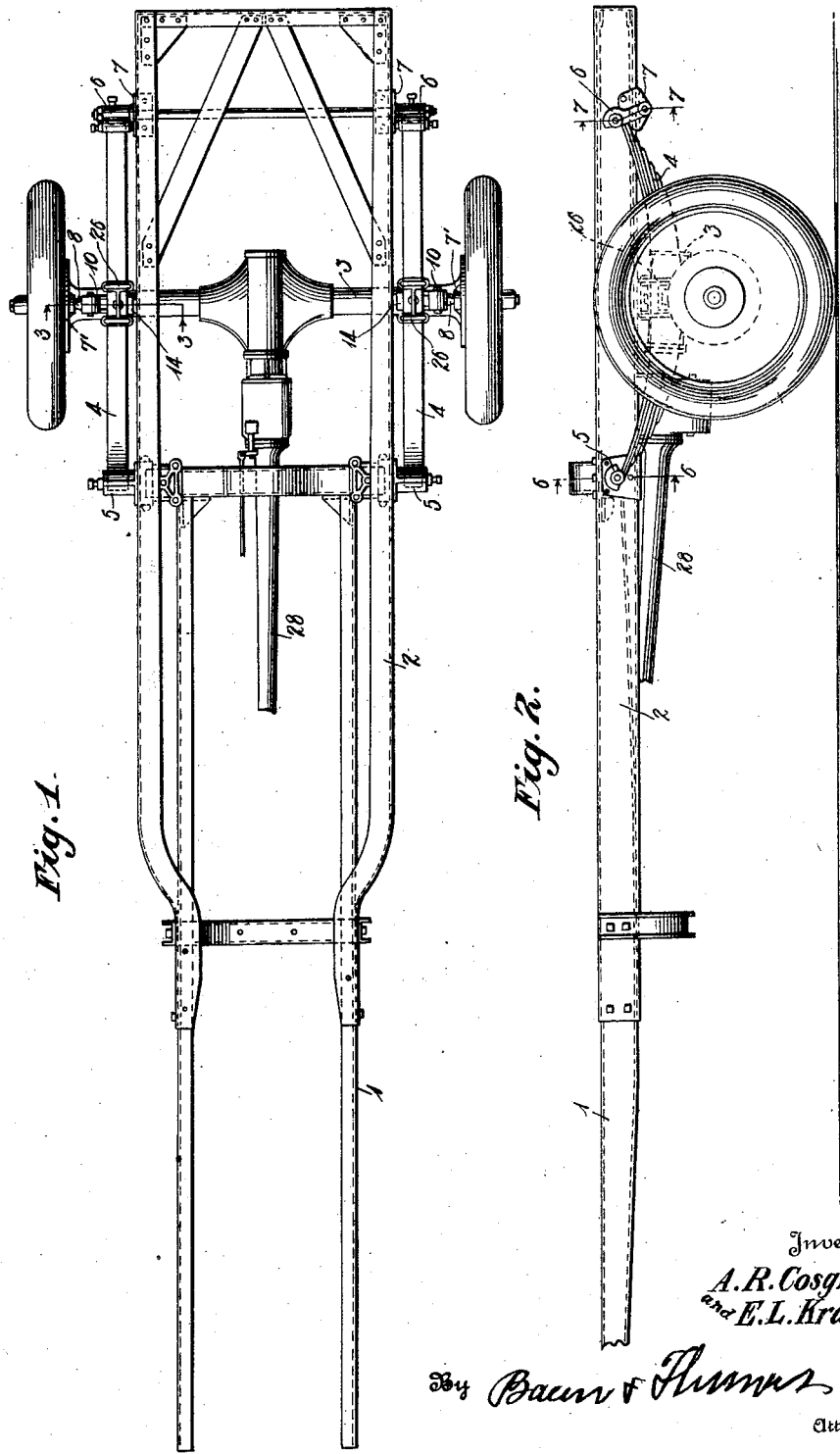

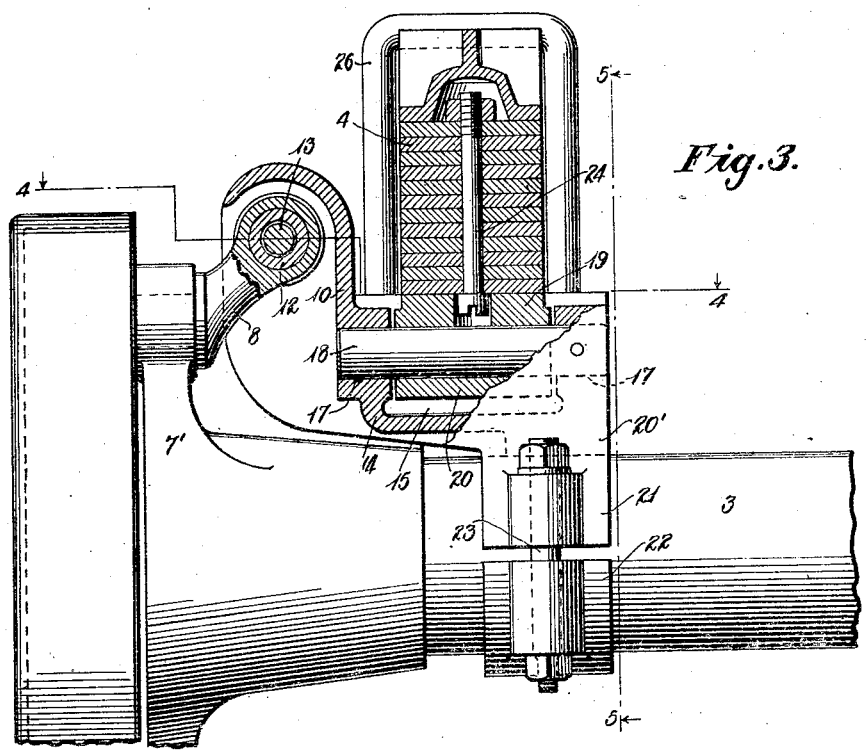
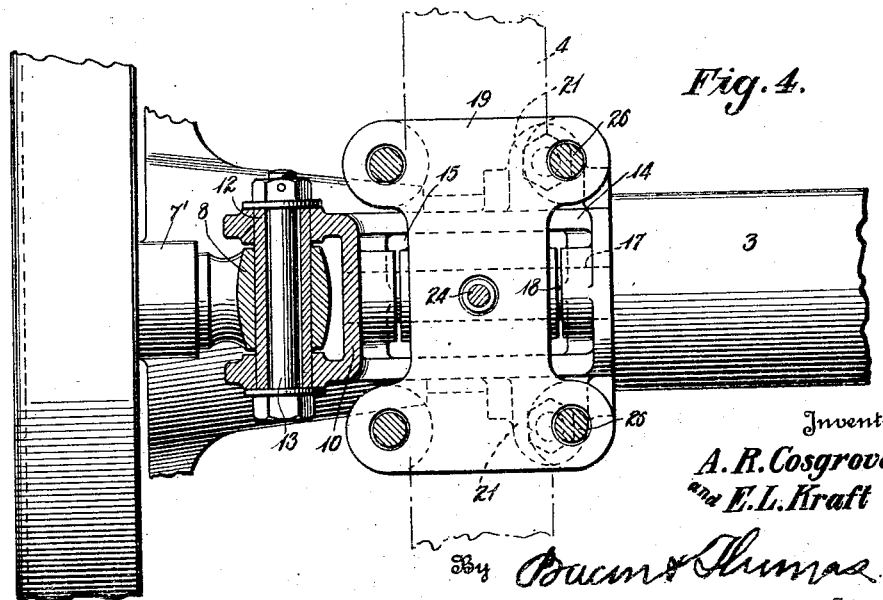

1,550,605

UNITED STATES PATENT OFFICE.

ALLEN R. COSGROVE AND EDWARD L. KRAFT, OF YORK, PENNSYLVANIA, ASSIGNORS TO MARTIN-PARRY CORPORATION, OF YORK, PENNSYLVANIA, A CORPORATION OF DELAWARE.

SPRING SUPPORT.

Application filed December 11, 1924. Serial No. 755,276.

*To all whom it may concern:*

Be it known that we, ALLEN R. COSGROVE and EDWARD L. KRAFT, citizens of the United States residing at York, in the county of York and State of Pennsylvania, have invented certain new and useful Improvements in Spring Supports, of which the following is a specification.

The invention relates to improvements in spring supports for securing side springs of an extension frame for a motor vehicle to the rear axle thereof without materially altering said axle or its housing.

It is an object of the invention to provide a spring support for application to the rear axle of an extension frame secured to a standard Ford truck or car for connecting side springs to the rear axle in lieu of the usual transverse springs of the standard Ford car without altering the axle housing or parts carried thereby.

The invention further comprehends an improved attachment for the rear axle housing of a Ford when utilized in an extension frame capable of adequately supporting side springs, and at the same time permitting the torque rod to be readily connected without placing severe strains thereon.

With the foregoing conception in mind, the invention primarily resides in mounting side springs on plates pivoted to said spring supports so that the torque rod can be freely elevated to a position to be connected with the extension shaft casing.

In the accompanying drawings we have shown a preferred embodiment of our invention, in which:

Figure 1 is a plan view of a motor vehicle chassis with an extension frame applied thereto and with side springs secured to the extension frame and to the rear axle.

Fig. 2 is a side elevation thereof.

Fig. 3 is an enlarged section on the line 3—3 of Fig. 1.

Fig. 4 is a horizontal section on the line 4—4 of Fig. 3.

Fig. 5 is a vertical section on the line 5—5 of Fig. 3.

Fig. 6 is an enlarged section on line 6—6 of Fig. 2.

Fig. 7 is a similar view on the line 7—7 of Fig. 2.

Referring now more particularly to the drawings wherein like reference characters indicate corresponding parts, the numeral 1 designates the usual Ford frame or chassis to which the extension frame 2 is applied. This frame is united to the standard chassis in any well known manner. The rear end of the frame 2 is connected with the rear axle housing 3, which housing contains the usual driving axle, differential mechanism, etc., and is in fact the standard axle and housing used in the Ford truck. On each side of the extension frame side springs 4 are provided, these springs being secured at their forward ends to the permanent spring hangers 5 attached to the extension frame, while the rear ends of the springs are secured to the frame by a pivoted shackle 6 carried by bracket 7.

The present invention comprehends improved means for securing said side springs 4 to the rear axle of the vehicle. It will be appreciated that the rear axle utilized with the extension frame is the standard Ford axle and the present invention aims to provide an improved spring support which can be mounted on this axle without altering the same. The axle housing 3 carries the conventional perch support casting 7' provided with a portion extending upwardly beyond said housing. This casting near its upper end has rigidly fitted thereto the conventional spring perch 8 projecting inwardly and outwardly from the support 7'. It will be appreciated that a perch support casting and spring perch is disposed on the axle housing near each side thereof as this structure is utilized in the Ford car for supporting the transverse springs which are not employed in the present extension frame. In lieu of these springs the present invention contemplates the use of the side springs 4 which are connected to the axle housing in a manner to be now described.

A spring support is disposed at each side of the housing and inasmuch as each support is of the same identical construction a description of one will suffice for both. This support has a vertical arm 10 of substantial U-shaped cross-section and so constructed as to span the upper end of its perch 8. The separated portions of the vertical arm are provided with alined apertures adapted to receive a perch support bushing 12 passing therethrough and through the usual opening found in the spring perch. A perch pin 13 is preferably passed through said bushing and secured in position by washers or the like. The spring support is also provided with a substantially horizontal body section 14 preferably integral with the vertical arm thereof and adapted to extend substantially parallel with the axle housing. The base of the body is provided with a pocket 15 of substantial depth. The side walls of the pocket have therein a pair of alined portions 17 receiving the pivot pin 18 for a purpose which will now appear.

To provide a pivot seat or connection for each side spring 4 the base of each support receives in the pocket therein a spring pad or plate 19 having a centrally depending part 20 adapted to fit within the pocket 15 and centrally apertured to receive the supporting pin 18 passing through the openings in the walls of the pocket. The pocket in the base of the support is of such an area as to provide a clearance sufficient to permit a rocking movement of the spring pad or plate on the rigidly mounted bracket 10.

To hold each bracket in a rigid position on the axle housing and to support the major part of the load on this housing, the base of the bracket is formed with a downwardly-extending portion 20 having a yoke 21 encircling the upper part of the axle housing. A fastening yoke 22 is also placed around the lower part of the housing and these yokes are united by fastening bolts 23 disposed on both sides thereof. When the bolts are tightened the bracket is firmly drawn down on the axle housing and is incapable of any movement relative thereto. The pivotal connection between the vertical arm 10 of the bracket and the spring perch permits the base of the bracket to be initially adjusted with reference to the axle housing so that it may be properly attached even though the housing or the perch may not be free from defects or irregularities in contour.

It will be understood that the spring pad 20 mounted on the base of each bracket is free to pivot on its supporting pin 18. The axle housing is, therefore, capable of a certain rotary movement relative to the springs and the frame. Each side spring is attached to its pad by means of a center bolt 24 passing through an opening in one of the spring pads and through the spring leaves. U-shaped fastening bolts 26 are also preferably employed for securing a spring to its pad at each side thereof. The pivotal movement of the axle or the pivotal movement of the springs is highly beneficial as it permits the torque shaft 28 to be freely elevated to a position where it can be secured to the casing of an extension drive shaft during the assembly of the frame. In the past where the springs are rigidly mounted upon the axle housing if the torque shaft is slightly sprung it is exceedingly difficult to connect the same at its forward end. In fact, it has often been necessary to utilize great pressure in forcing this shaft to a point where a connection can be made. Such pressure is not necessary when the springs are pivotally connected in the manner described.

Having thus described the invention, what we claim is:

1. The combination with a vehicle chassis having a rear axle and a housing therefor, of a spring perch support and a spring perch on said housing, a bracket having a base and an arm extending therefrom, means for securing said arm to said spring perch, means for securing said base to the axle housing, a spring plate pivotally mounted on said base and disposed below said spring perch, and a side spring secured to said pivotally mounted spring plate.

2. The combination with an automobile chassis including side frames, a rear axle and a housing therefor, of a supporting element carried by said rear axle and disposed above the same, a spring supporting bracket having a substantially horizontal base and a vertical extension, means for attaching said extension to said support carried by the axle, a spring plate pivotally mounted on said base below the point of attachment between said arm and said support, means for clamping said base to the axle housing, and a spring rigidly connected to said plate.

3. The combination with an automobile chassis, including side frames and a rear axle, a perch support carried by said axle, a spring perch connected with said support and extending therefrom, a spring bracket, said bracket being provided with a vertical arm pivoted to said spring perch, the bracket having a body portion disposed adjacent the axle housing, a pivoted spring plate, means carried by said horizontal body of said bracket for pivotally mounting said plate below the pivotal connection between said arm and said spring perch, a spring connected with said pivoted plate, and means for clamping said bracket to the axle housing.

4. The combination with the rear axle of an automobile, a perch support, a spring perch projecting therefrom, a spring supporting bracket having a horizontal body portion disposed adjacent the axle of the housing and connected therewith, and a vertical arm extending substantially above the horizontal body of the bracket, means for connecting said vertical arm to the spring perch, a spring plate pivotally mounted on said body of the bracket and lying below the point of connection between said upstanding part thereof and said spring perch, and means for securing a spring to said pivotally mounted spring plate.

5. The combination with the rear axle of an automobile having an axle housing, a perch support, a spring perch projecting therefrom, a bracket having an arm, means for connecting said arm to said spring perch, said bracket being provided with a horizontal body portion disposed adjacent the axle housing, a pocket within said body portion, a spring plate, means for pivotally mounting said spring plate in said pocket, a spring attached to said plate, and means for securing said body portion and said bracket to said axle housing.

In testimony whereof we affix our signatures.

ALLEN R. COSGROVE.
EDWARD L. KRAFT.